(12) United States Patent
Sajady

(10) Patent No.: US 10,840,963 B2
(45) Date of Patent: Nov. 17, 2020

(54) MEANS OF PROTECTING A MOBILE ELECTRONIC DEVICE UTILIZING ONLY THE CORNERS OF THE DEVICE

(71) Applicant: C4 Designs, LLC, Dallas, TX (US)

(72) Inventor: Masood Sajady, Chanhassen, MN (US)

(73) Assignee: C4 DESIGNS, LLC, Dallas, TX (US)

( * ) Notice: Subject to any disclaimer, the term of this patent is extended or adjusted under 35 U.S.C. 154(b) by 0 days.

(21) Appl. No.: 14/149,338

(22) Filed: Jan. 7, 2014

(65) Prior Publication Data

US 2015/0194993 A1 Jul. 9, 2015

(51) Int. Cl.
*H04M 1/00* (2006.01)
*H04B 1/3888* (2015.01)
*H04M 1/18* (2006.01)
*G06F 1/16* (2006.01)

(52) U.S. Cl.
CPC ......... *H04B 1/3888* (2013.01); *G06F 1/1626* (2013.01); *H04M 1/185* (2013.01); *G06F 2200/1633* (2013.01)

(58) Field of Classification Search
CPC ....... H04B 1/3888; G06F 1/181; H04M 1/026
USPC .......................................................... 455/575.8
See application file for complete search history.

(56) References Cited

U.S. PATENT DOCUMENTS

| | | | | |
|---|---|---|---|---|
| 8,065,443 | B1* | 11/2011 | White et al. | 710/8 |
| 8,509,865 | B1* | 8/2013 | LaColla | H04B 1/3888 455/575.8 |
| 8,584,847 | B2* | 11/2013 | Tages | H04B 1/3888 206/320 |
| 8,774,882 | B2* | 7/2014 | Tages | H04M 1/185 455/575.8 |

* cited by examiner

*Primary Examiner* — Amancio Gonzalez
(74) *Attorney, Agent, or Firm* — Kirby Drake

(57) ABSTRACT

The present invention relates to the protective devices for a mobile electronic device that comprises of multiple detachable corner bodies which attach solely to the corners of the device. The detachable corner bodies extend beyond the physical dimensions of the mobile electronic device so as to prevent the device from the striking hard surfaces directly on physical edges of the mobile electronic device. By doing so, the present invention can be used to protect the mobile electronic device from unavoidable strikes with hard surfaces without sacrificing the designed beauty characteristics of the mobile electronic device.

18 Claims, 3 Drawing Sheets

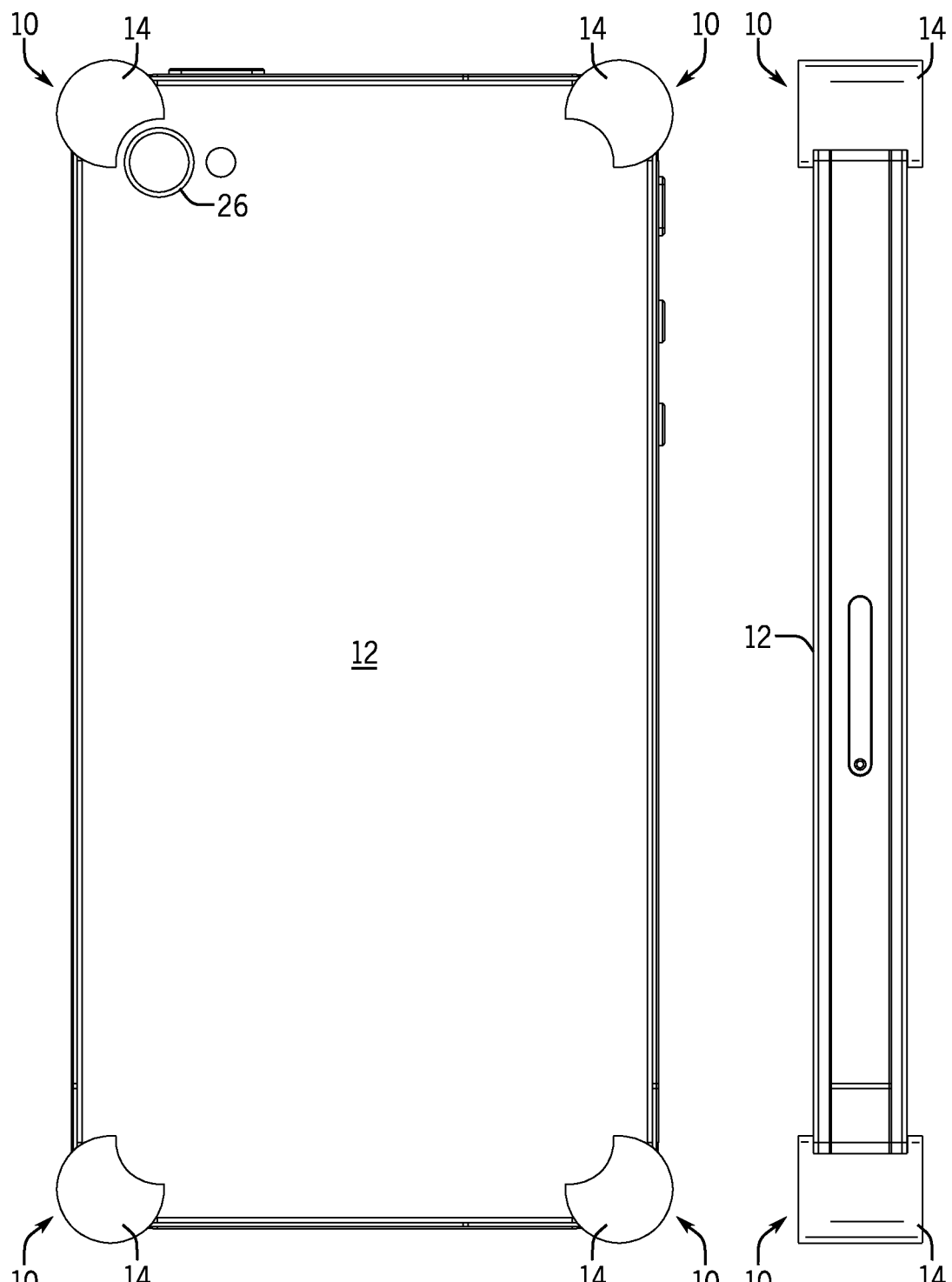

MEANS OF PROTECTING A MOBILE ELECTRONIC DEVICE UTILIZING ONLY THE CORNERS OF THE DEVICE

CROSS-REFERENCE TO RELATED APPLICATIONS

This application claims the benefit of provisional patent application Ser. No. 61/58,306 filed 2012 Jan. 8 by the present inventor. It further claims the benefit of provisional patent application No. 61/750,241 filed 2013 Jan. 8 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND—FIELD

This invention relates to protection of mobile electronic devices, such as cellular phones, tablet computers, or notebook computers, from impact with hard surfaces.

BACKGROUND OF THE INVENTION

Since the invention of the mobile electronic device, they have gone from being the expensive tools of the world's elite to being an irreplaceable part of most everyone's day-to-day life, both personal and professional. They can be found in the hands of almost everyone from the very young to the very old. Over the years, the devices have gone from being big, bulky, unsightly unitaskers to small, sleek, and sexy multitaskers. The evolution of these mobile electronic devices make them convenient for an everyday user to not only take them wherever they go, but also, to proudly display their function and design to those people they meet throughout their lives. Examples of such mobile electronic devices include cellular phones, smart phones, personal data assistants, electronic media players, notebook computers, laptop computers, netbook computers, tablet computers, e-readers, cameras, video cameras, personal medical devices, insulin pumps, portable video game consoles, video game controllers and the like.

Since the birth of the mobile electronic device, they have been plagued by one unavoidable consequence to making the devices portable—damage due to impact of the device with a hard surface. With each new generation of mobile electronic devices, the manufactures constantly decrease the form factor of the devices while continuing to pack more and more features into the devices. It is a constant battle between the manufactures for who has the smaller, sleeker and sexier device without losing any of functionality of previous models. While these characteristics are often the deciding factor by a consumer when deciding between devices, it is these same characteristics which make the devices more and more susceptible to damage due to striking a hard surface.

At this point in the evolution of mobile electronic devices, it is an eventuality that everyone who owns a mobile electronic device will experience some sort of damage to their device whether merely cosmetic or completely fatal to the overall use of the device. Due to the increasing need to provide protection for these devices, most consumers rely upon protection systems which completely enclose the device in a protective shell which hides the device's sleek and sexy form factor. These other protection systems do so by sacrificing the size and shape of the original device and effectively negating the characteristics which influenced the consumer's decision between one device and another. These other protective systems do so by adding excessive bulk to the device to provide protection. Those systems which are designed to be ascetically pleasing do so by sacrificing the overall protection of the device. Thus, it is desirable to find a method of protecting the device while still retaining the devices intended design elements and full functionality.

SUMMARY OF THE INVENTION

The present invention provides a protection device that is comprised of multiple detachable corner bodies which may be formed from any type of material. The multiple detachable corner bodies are then attached solely to corners of the mobile electronic device through an attachment method. They are designed in such a way as to extend beyond the corners of the device offering protection against damage due to dropping the device and normal wear and tear by elevating the device edges from hard surfaces. They are further designed to allow the user to effortlessly access the multiple input/output interfaces of the mobile electronic device, such as the camera, the flashlight, the head phone jack, the speakers, the volume buttons, the charging port, the data exchange port, or any other interface the mobile device manufacture chooses to include within its design. By attaching solely to the corners of the mobile electronic device, the protective device does not inhibit the functionality of the device and the designed beauty characteristics of the mobile electronic device which originally influenced the consumer to purchase the mobile electronic device.

An embodiment of the present invention may comprise of different attachment methods by which the detachable corner bodies are attached to the device at its corners.

An embodiment of the present invention may comprise of different methods by which the detachable corner bodies are manufactured.

An embodiment of the present invention may comprise of different designs of the detachable corner bodies which can be personalized to the end users individual taste, style and artistic desires.

An embodiment of the present invention may comprise of a design of the detachable corner bodies which act as a stand for the mobile electronic device to rest on its sides, top or bottom without the user actually holding the mobile electronic device.

BRIEF DESCRIPTION OF THE DRAWINGS

FIG. 5: is a bottom plan view.

FIG. 6: is a side elevation view.

DRAWINGS—REFERENCE NUMERALS

10: is the overall detachable corner body protector invention.

12: is a mobile electronic device.
14: is the detachable corner body.
16: is the attachment material.
18: is the backing.
20: is the double-sided adhesive strip.
22: is the recess of detachable corner body 14.
24: is the lunette-like cutout of detachable corner body 14.
26: is the lens.

DETAILED DESCRIPTION OF THE INVENTION

Most of the other protective devices and systems in the market today are clunky and hide the natural beauty of the mobile electronic device by covering the device with a protective case.

The present invention provides a protection device that is comprised of multiple detachable corner bodies which are attached solely to the corners of any mobile electronic device. By attaching solely to the corners of the mobile electronic device, the invention provides protection for the any mobile electronic device while not sacrificing the overall designed appearance the device.

The invention comprises of multiple detachable corner bodies which may be formed from any type of material including, but not limited to, metal, semi-precious metal, precious metals, plastic, rubber, elastomeric material, composite materials, composite metals, a thermoplastic polyurethane (TPU) and/or a thermal plastic elastomer (TPE) and/or some combination thereof. The multiple detachable corner bodies are then attached solely to the corners of the mobile electronic device through an attachment method, such as through the use of adhesive tapes, releasable adhesives, magnets, snap tab fasteners, or screws.

This method of attachment makes the present invention unique in protecting mobile electronic devices as only the corners of the device are covered by the detachable corner bodies. No matter how the device is dropped, it will land on the detachable corner bodies thereby protecting the mobile electronic device from damage due to impact from a hard surface.

Figure 1:
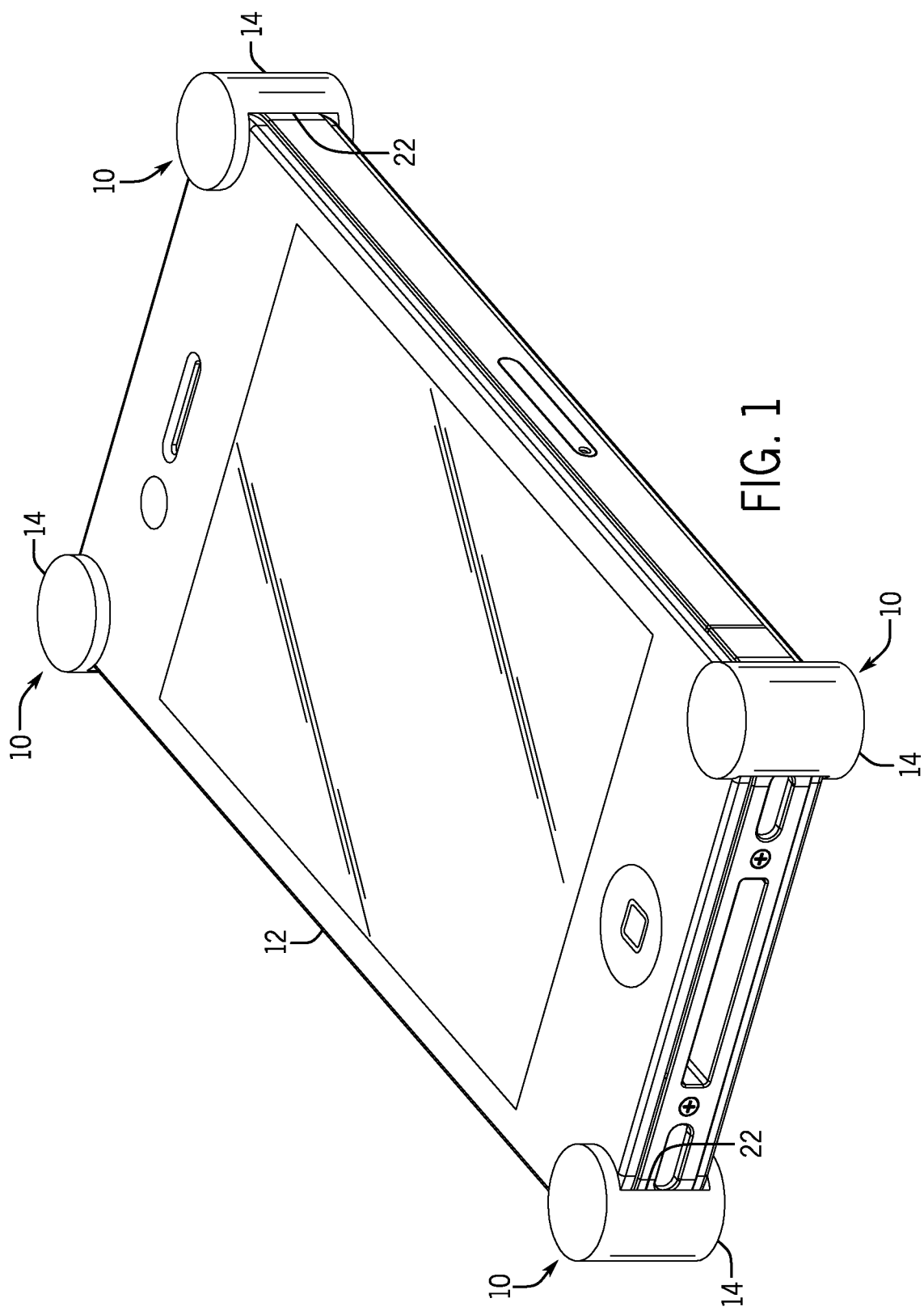
FIG. 1: is a front perspective view of the invention installed on a mobile electronic device.

Referring now to the invention in more detail, one embodiment of the present invention is illustrated in FIG. 1 (top view), FIG. 5 (bottom view), and FIG. 6 (side view). These figures depict the detachable corner bodies 14 of the present invention after they have been attached to the mobile electronic device 12 through an attachment method. The detachable corner bodies 14 comprise four individual similarly shaped bodies which are attached solely at the corner of the mobile electronic device 12. In this embodiment, the detachable corner bodies may be held in place via any known means of attachment, including, but not limited to adhesive tape, a magnet, snap tab fasteners, hook and look mechanism, or other high friction material. Any of these materials may be attached to, or incorporated into, the detachable corner bodies 14 in order to allow them to retain an inserted mobile electronic device 12 in the recess of the detachable corner body 22. Additionally, the detachable corner bodies may be customized to include one or more apertures or cutouts 24 necessary to accommodate any particular features of the mobile electronic device 14 including, but not limited to, a user interface or a port, a camera 26, a speaker, a flash or an access panel.

The detachable corner bodies 14 may be manufactured out of any known material which would provide a level of protection for the mobile electronic device 12 while being malleable enough to be formed into the desired shape and size. The manufacturing process of the detachable corner bodies 14 can be done by hand, with a machine or through an injection mold process wherein a mold of the detachable corner bodies 14 is filled with a material which subsequently hardens into the desired shape and size.

In more detail, still referring to the invention depicted in FIG. 1, FIG. 5 and FIG. 6, the detachable corner bodies 14 are manufactured to be long enough and wide enough to extend at least beyond the physical dimensions of the mobile electronic device 12. This creates a buffer between the mobile electronic device 12 and any hard surface which it may come in contact with. As understood by one skilled in the art, the detachable corner bodies 14 are manufactured to be symmetrical in size and shape so that they act both independently of each other and with each other to protect the mobile electronic device 12 from damage. The detachable corner bodies 14 can also be manufactured in such a way as to allow the mobile electronic device 12 to maintain standing up on its top, bottom or side without continued user involvement.

Additionally and/or alternatively, textures, graphics, coloration, designs, precious stones, or other features may be incorporated in the manufacturing process for the detachable corner bodies 14 to accommodate the end users individual tastes and style. For example, the detachable corner bodies 14 may be manufactured out of gold with an inset of diamonds or crafted in such a way as to embody an end users logo. By way of further example, the detachable corner bodies 14 may be designed to resemble icons such as a skull, heart, flower or any known shape.

Figure 2:
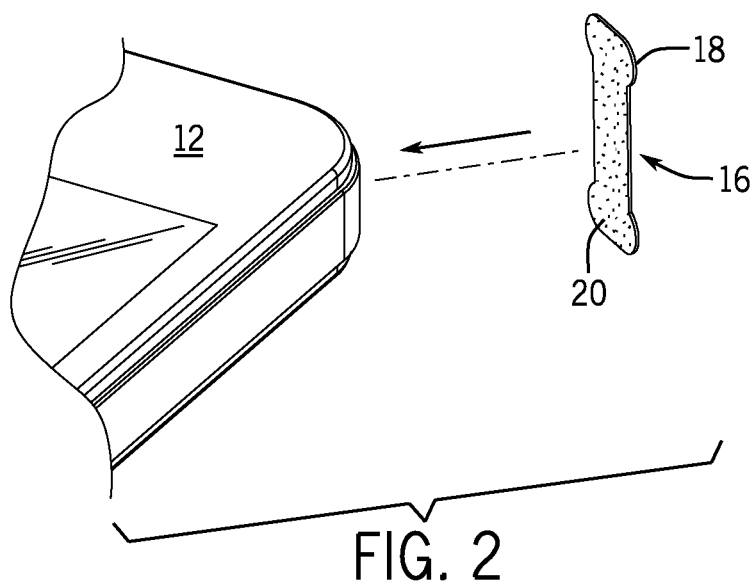
FIG. 2: is a detail exploded perspective view showing the first step in installing the protector invention.
Figure 3:
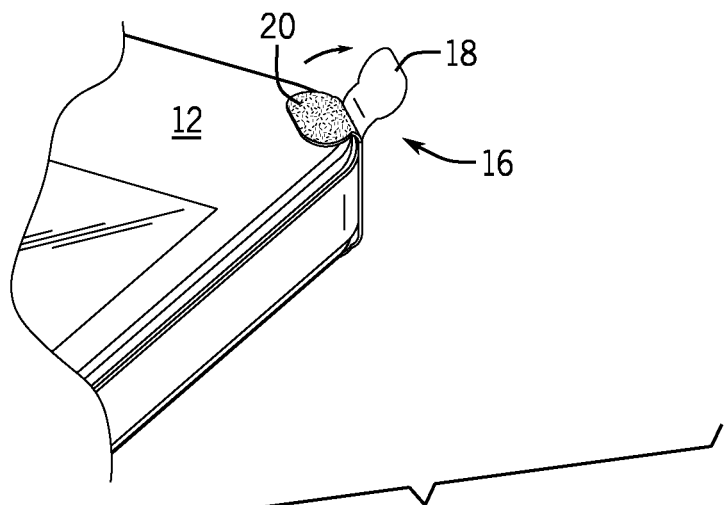
FIG. 3: is a detail perspective view showing the second step in installing the protector invention.
Figure 4:
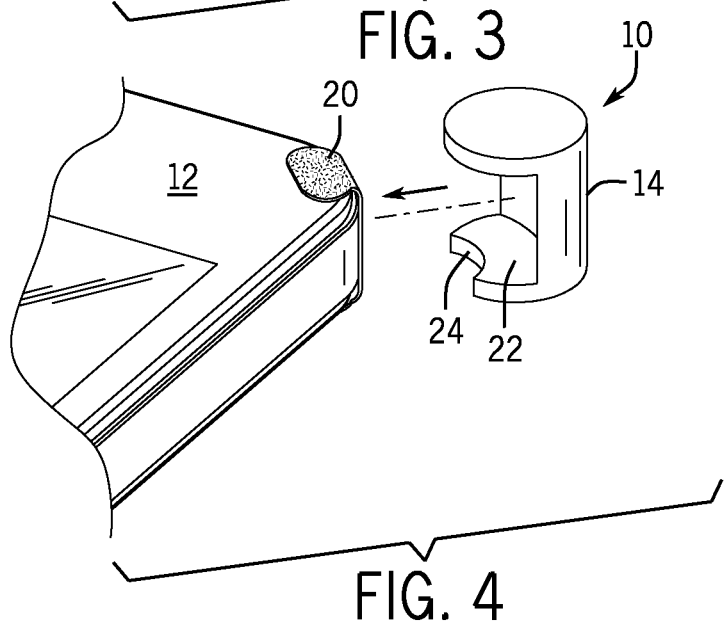
FIG. 4: is a detail exploded perspective view showing the third step in installing the protector invention.

Operation—FIGS. 2, 3, 4

The manner of using the detachable corner bodies 14 is uniquely different from all other mobile electronic device protection devices currently on the market today. Namely, all of the present protection devices involve covering most of the exterior of a mobile electronic device with a clunky protective case which hides the designed aesthetics of the mobile electronic device. The disclosed invention solves this problem by only utilizing minimal detachable corner bodies 14 which attach solely to the corners of the mobile electronic device 12.

To use the disclosed invention, an end user will attach the detachable corner bodies 14 to the mobile electronic device 12 utilizing an attachment method. One embodiment of this attachment process, utilizing double sided adhesive tape 20, is depicted in FIG. 2, FIG. 3 and FIG. 4. As shown in FIG. 2, an end user would first remove the removal backing 18 from one side of the double-sided adhesive tape 20 to expose the attachment material 16. Once the removal backing 18 is removed, the end user would adhere the double-sided adhesive tape 20 to the corner of the mobile electronic device 12 by pressing the exposed attachment material 16 on the corner of the device and compressing it around the corner of the mobile electronic device 12 to ensure that proper bonding occurs.

As shown in FIG. 3, once the first side of the double-sided adhesive tape 20 is adhered to the corner of the mobile electronic device 12, the end user would then remove the removal backing 18 from the other side of the double-sided adhesive tape 20 to expose the attachment material 16 on the opposite side of the double-sided adhesive tape 20.

As shown in FIG. 4, the end user would then take the detachable corner body 14 and orientate it wherein the recess of the detachable corner body 22 would be orientated toward the mobile electronic device 12 and top of the detachable corner body 14 would be aligned with the top of the mobile electronic device 12. In the embodiment depicted in FIG. 4, the lunette-like cutout of the detachable corner body 24 is orientated toward the back of the mobile electronic device 12. As the reader will note in FIG. 5, the lunette-like cutout of the detachable corner body 24 in this embodiment of the disclosed invention is designed to accommodate the lens of the camera 26.

Once the detachable corner body 14 is orientated correctly, the end user would press the recess of the detachable corner body 22 onto the exposed attachment material 16 of the double-sided adhesive tape 20 on the corner of the mobile electronic device 12. By compressing the detachable corner body 14 onto exposed attachment material 16 of the double-sided adhesive tape 20 on the corner of the mobile electronic device 12, the end user will create a high friction adhesive bond between the detachable corner body 14 and the mobile electronic device 12.

The process depicted in FIG. 2, FIG. 3 and FIG. 4 is then repeated for each corner of the mobile electronic device 12 until all of the detachable corner bodies 14 are adhered to the corners of the mobile electronic device 12 using the double-sided adhesive tape 20.

Alternative Embodiments

There are various possibilities on the method for attaching the detachable corner bodies 14 to the corners of the mobile electronic device 12. Not illustrated here, but covered by the disclosed invention, are methods may involve other types of adhesive devices besides double-sided adhesive tape 20, magnets, snap tab fasteners, screws, hook and look mechanisms, or other high friction materials. Those of ordinary skill in the art will understand and appreciate the existence of variations, combinations, and equivalents of the illustrated attachment method.

Advantages

From the description above, a number of advantages of disclosed invention become evident:
(a) The protective system as a whole allows the end user to proudly display the manufactures designed appearance of the mobile electronic device without sacrificing protection of the device.
(b) The detachable corner bodies can be mass produced out of any number of materials, including, but not limited to, those that are easily recyclable.
(c) The detachable corner bodies can be attached to the mobile electronic device in any number of different ways which will allow the user to alter the attachment method as future attachment methods are discovered without having to purchase new detachable corner bodies.
(d) The detachable corner bodies can be reused any number of times without a loss in their overall protective ability.
(e) The detachable corner bodies can be individually customized to fit the end users taste, style and mood.
(f) The detachable corner bodies utilize less material than the present protection systems available on the market which lowers the overall impact on the environment.

CONCLUSIONS, RAMIFICATIONS, SCOPE

Accordingly, the reader will see that the disclosed invention is an improvement over the current mobile electronic device protection systems available on the market today in that it provides maximum protection for the device while minimizing the effect of the invention on actual appearance of the device. Furthermore, it allows the end user to fully customize the shape, design and overall look of the detachable corner bodies to fit the end user's personal taste and style without sacrificing any of the protective qualities of the invention.

In the above detailed description, numerous specific details are set forth by way of examples in order to provide a thorough understanding of the relevant teachings. However, it should be apparent to those skilled in the art that the present invention may be accomplished without such details. In other instances outlined above, well known methods, procedures, and/or components, have been described at a high-level in order to avoid confusing the relevant aspects of the invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A protection device comprising:
a set of four detachable corner bodies, each detachable corner body having a cutout or aperture configured to securely fit and protect a mobile electronic device,
wherein three corner bodies of the set of four detachable corner bodies are similar in shape,
wherein one detachable corner body of the set of four detachable corner bodies has a lunette shape configured to accommodate features or protrusions of the mobile electronic device,
wherein the set of four detachable corner bodies are configured to attach to each corner of the mobile electronic device via a compression force; and
wherein each detachable corner body attaches solely to a corner of the mobile electronic device and extends beyond physical dimensions of the mobile electronic device.

2. The protection device of claim 1, wherein the mobile electronic device is a cellular phone.

3. The protection device of claim 1, wherein the mobile electronic device is a smart phone.

4. The protection device of claim 1, wherein the mobile electronic device is a tablet computer.

5. The protection device of claim 1, wherein the mobile electronic device is a handheld computer.

6. The protection device of claim 1, wherein the mobile electronic device is a notebook computer.

7. The protection device of claim 1, wherein the mobile electronic device is an ultra-mobile computer.

8. The protection device of claim 1, wherein the mobile electronic device is an e-reader.

9. The protection device of claim 1, wherein the set of four detachable corner bodies are symmetrical in size and shape.

10. The protection device of claim 1, wherein the set of four detachable corner bodies are constructed to allow unobstructed access to all of the features of the mobile electronic device.

11. The protection device of claim 1, wherein the set of four detachable corner bodies are constructed to allow unobstructed access to input/output interfaces or elements of the mobile electronic device.

12. The protection device of claim 1, wherein the set of four detachable corner bodies are constructed to allow unobstructed usage of input/output interfaces or elements of the mobile electronic device.

13. The protection device of claim 1, wherein the set of four detachable corner bodies are configured to attach to each corner of the mobile device by applying a bonding agent without any hardware or tools.

14. The protection device of claim 13, wherein the bonding agent includes a double-sided pressure sensitive adhesive tape between each of the four detachable corner bodies and each corner of the mobile electronic device, wherein a flexible support provides a first side coated with a pressure sensitive adhesive, and wherein a second side is coated with an identical pressure sensitive adhesive.

15. The protection device of claim 13, wherein the bonding agent includes a double-sided pressure sensitive adhesive tape between each of the four detachable corner bodies and each corner of the mobile electronic device,
wherein a flexible support provides a first side coated with a first pressure sensitive adhesive, and
wherein a second side is coated with a second pressure sensitive adhesive, the second pressure sensitive adhesive has a surface energy higher that the first pressure sensitive adhesive.

16. The protection device of claim 1, further comprising:
a releasable adhesive joint arranged between each of the detachable corner bodies and each corner of the mobile electronic device, wherein the releasable adhesive joint includes a heatable adhesive compound that loses its adhesion to each of the detachable corner bodies or each corner of the mobile electronic device.

17. The compression method of claim 1, wherein the set of four detachable corner bodies form a front and a back housing member, and wherein one or more snap tab fasteners are built into each of the four detachable corner bodies for connecting the front and back housing members together.

18. The compression method of claim 1, wherein the set of four detachable corner bodies form a front and a back housing member and provide one or more screw holes originating in the back housing member and terminating within the front housing member, and wherein one or more screws are arranged to connect the front and back housing members together.

* * * * *